US012509141B2

(12) United States Patent
Pásztor et al.

(10) Patent No.: US 12,509,141 B2
(45) Date of Patent: Dec. 30, 2025

(54) POWER SAVING MODE FOR STEERING SYSTEMS OF A MOTOR VEHICLE

(71) Applicants: thyssenkrupp Presta AG, Eschen (LI); Honda Motor Co., Ltd., Tokyo (JP)

(72) Inventors: Levente Pásztor, Budapest (HU); Imre Benyo, Budapest (HU); Péter Kakas, Budapest (HU); Yosuke Ojima, Wako (JP); Munetsugu Hanji, Wako (JP); Hayato Miyakawa, Wako (JP); Yoshinobu Watanabe, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 589 days.

(21) Appl. No.: 17/969,015

(22) Filed: Oct. 19, 2022

(65) Prior Publication Data
US 2023/0041535 A1 Feb. 9, 2023

Related U.S. Application Data

(63) Continuation of application No. PCT/EP2020/061019, filed on Apr. 20, 2020.

(51) Int. Cl.
*B62D 5/04* (2006.01)
*B62D 5/00* (2006.01)

(52) U.S. Cl.
CPC ............ *B62D 5/0463* (2013.01); *B62D 5/001* (2013.01)

(58) Field of Classification Search
CPC .................................................. B62D 5/0463
See application file for complete search history.

(56) References Cited

U.S. PATENT DOCUMENTS

2004/0003954 A1* 1/2004 Sugitani ................... B62D 1/12
  180/402
2015/0203152 A1   7/2015 Katayama et al.

FOREIGN PATENT DOCUMENTS

EP        3 006 307 A1      4/2016
JP        2004276834 A  *  10/2004
WO        WO-2018130297 A1 *  7/2018 ........... B62D 5/0409

OTHER PUBLICATIONS

Official Communication issued in International Patent Application No. PCT/EP2020/061019, issued on Oct. 25, 2022.
Official Communication issued in International Patent Application No. PCT/EP2020/061019, mailed on Dec. 22, 2020.

* cited by examiner

*Primary Examiner* — Jacob D Knutson
(74) *Attorney, Agent, or Firm* — Keating & Bennett, LLP

(57) ABSTRACT

A method for power saving in a steering system of a motor vehicle including a road wheel actuator acting on a rack to turn steerable road wheels and a controller configured or programmed to generate an operation signal for the road wheel actuator, wherein the controller includes a position controller to generate a motor torque request based on an actual and/or a measured position of the rack and a requested rack position, includes detecting a passive mode of the steering system by a passive mode detector of the controller if the motor vehicle is stopped and no steering input is provided, and if a passive mode is detected by the passive mode detector, setting the motor torque request to zero in order to save power.

8 Claims, 2 Drawing Sheets

POWER SAVING MODE FOR STEERING SYSTEMS OF A MOTOR VEHICLE

CROSS REFERENCE TO RELATED APPLICATIONS

This application claims the benefit of priority to PCT Application No. PCT/EP2020/061019 filed on Apr. 20, 2020. The entire contents of each application are hereby incorporated herein by reference.

BACKGROUND OF THE INVENTION

1. Field of the Invention

The present invention relates to a method for power saving in a steering system of a motor vehicle.

2. Description of the Related Art

In steer-by-wire systems, there is no mechanical connection between the steering wheel and the steering rack and the steerable wheels. A feedback actuator acting on the steering wheel gives feedback to the driver. Steering movement is achieved by an electrically controlled motor, which is part of a road wheel actuator acting on the steering rack. A position controller is present to move the steering rack to the desired position, thus realizing the desired road wheel angle. The position controller acts such that the road wheel actuator follows the reference position signal. The position controller is active even if the car is stopped and the driver provides no steering input. Thus, the power consumption of the steering system and the thermal load on the motor and the electronic controller (ECU) remains high. As a result, the end of useful life of the electrical components is reached faster.

SUMMARY OF THE INVENTION

Therefore, preferred embodiments of the present invention provide methods for power saving in steering systems that each decrease a thermal load on a motor of a road wheel actuator and an electronic controller thereof.

According to a preferred embodiment of the present invention, a method for power saving in a steer-by-wire steering system or electric power assisted steering systems of a motor vehicle including a road wheel actuator acting on a rack to turn road wheels and a controller configured or programmed to generate an operation signal for the road wheel actuator, the controller including a position controller configured or programmed to generate a motor torque request based on an actual or an estimated position of the rack and a requested rack position, includes detecting a passive mode of the steering system by a passive mode detector of the controller if the motor vehicle is stopped and no steering input is provided, and in case a passive mode is detected by the passive mode detector, setting the motor torque request to zero in order to save power.

The passive mode leads to a decrease in power consumption of the steering system. Further, the system is not warming up, which increases a usable life of electrical components.

In a first preferred embodiment, the motor torque request can be set to zero by usage of a torque limiter, which limits the motor torque request gradually to zero if a passive mode is detected. Advantageously, the torque limiter gradually increases a limit value to a predefined maximum value, if a signal from the passive mode detector indicates that the vehicle is activated and that the passive mode is no longer present.

In a second preferred embodiment, the motor torque request can be set to zero by modifying of the requested rack position. Preferably, the requested rack position is gradually modified by changing a previous modification of the requested position of the rack to substantially zero, if the signal from the passive mode detector indicates that the motor vehicle is activated and that the passive mode is no longer present.

Further, a steer-by-wire-steering system of a motor vehicle is provided, which is designed to carry out the previously described method. The rack of such a steering system can be part of a front or a rear axle. The controller is preferably situated next to the road wheel actuator.

In general, steering input can be provided by the driver, for example, by turning a steering wheel or operating a steering device, or by a vehicle controller for autonomous vehicle control.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
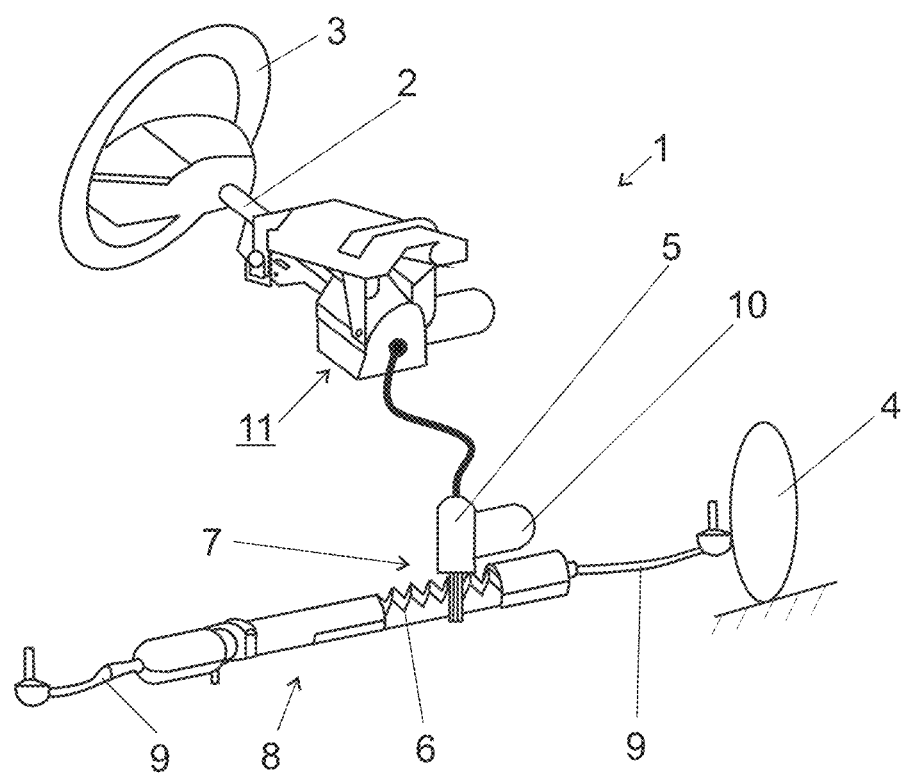
FIG. 1 is a schematic illustration of a steer-by-wire steering system of a motor vehicle.

FIG. 1 is a schematic drawing of a steer-by-wire system 1 with a steering shaft 2 connected to a steering device 3. There is no mechanical connection between the steering device 3 and the road wheels 4. A road wheel actuator 5 operates a gear rack 6 via a rack-and-pinion gear 7, which is part of a front wheel axle 8. The front wheel axle 8 includes two tie rods 9 for road wheels 4, of which only one road wheel 4 is shown.

When a driver operates the steering device 3, steering shaft 2 is rotated, which is detected by a shaft sensor, which is not shown in the drawings. When the vehicle is switched on, a controller 10, situated next to the road wheel actuator 5, configured or programmed to generate an operation signal for the road wheel actuator 5 from the signal detected by the shaft sensor. By operating gear rack 6 with the operation signal, the front wheel axle 8 is moved sideways and the road wheels 4 are turned. At the same time, forces introduced in the wheel axle 8 from the road wheels 4 are recognized by another sensor not shown in the drawings, and a feedback signal is generated, which is applied to the steering shaft 2 by a feedback actuator 11, so that the operator can recognize the feedback in the steering device 3.

The controller 10 includes a position controller configured or programmed to generate a motor torque request based on the actual or/and a measured position of the rack 6 and a requested rack position. The road wheel actuator 5 thus follows a reference position signal.

In a passive state of the motor vehicle, position tracking of the rack 6 is not required. The vehicle is considered to be passive, if the following conditions are both met:

the car is stopped (vehicle velocity is zero and velocity of the driven road wheels is zero); and no steering input is provided by the driver.

Under these conditions, the position control can be switched off, thus entering a power saving mode. The power saving mode is realized by substantially zero torque request. A substantially zero request of the road wheel actuator motor torque can be achieved by acting on the requested motor torque with a torque limiter. "Substantially" means that there is a hardware-related inaccuracy and that there might be a remaining motor torque request even if the request is set to zero.

Figure 2:
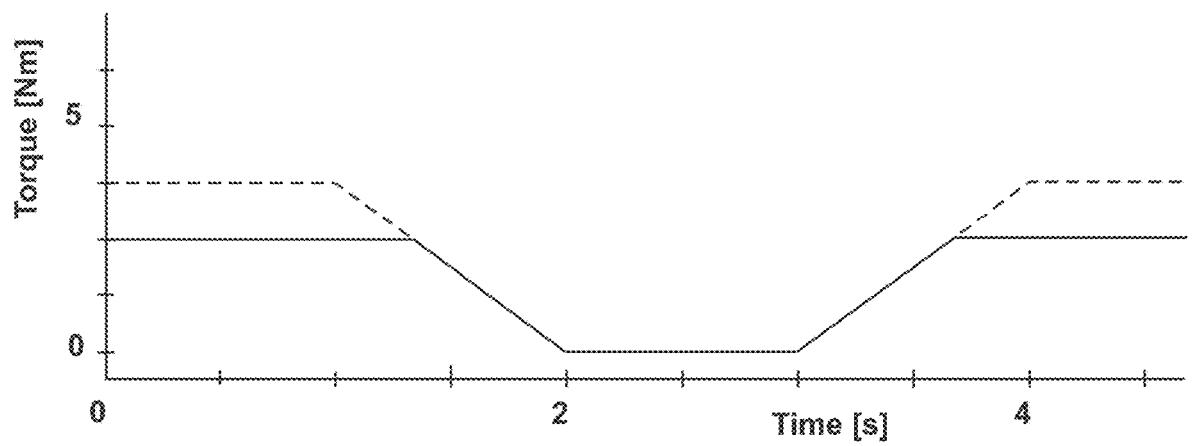
FIG. 2 shows the dependencies of a motor torque limit and a limited motor torque on time.
Figure 3:
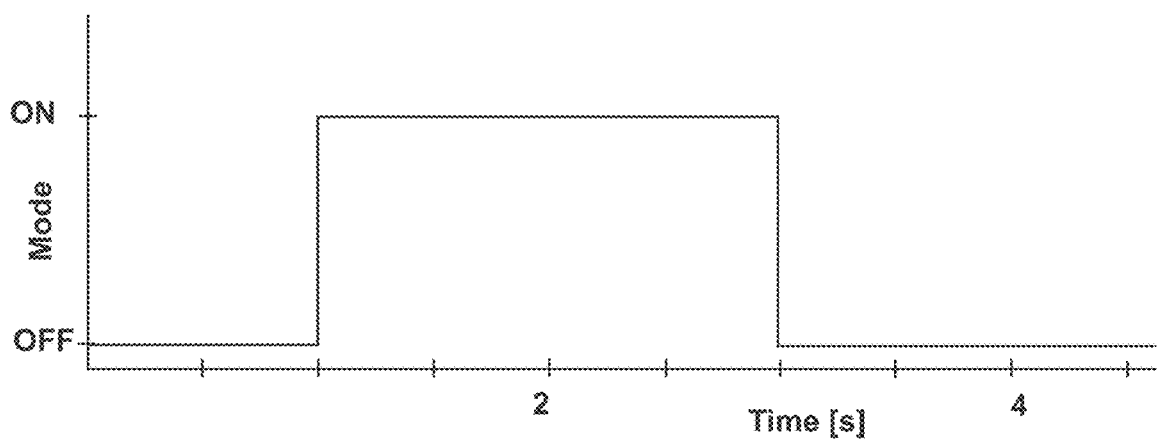
FIG. 3 shows a diagram of operation modes plotted against time.

FIGS. 2 and 3 show two diagrams. FIG. 2 shows a motor torque limit provided by the limiter (dashed line) and the resulting limited motor toque (solid line) plotted against time. FIG. 3 shows the operation mode plotted against time, wherein "OFF" represents a normal mode of operation and "ON" represents a power saving mode.

The torque limiter reads in the requested motor torque, which was generated by the position controller and a signal from a passive mode detector. If the signal from the passive mode detector signals that the vehicle is in passive mode, the torque limiter decreases the limit value gradually until zero. The requested motor torque follows the limits and is limited to zero torque. If the signal from the passive mode detector signals that the vehicle is activated and that the passive mode is no longer present, the torque limiter gradually increases the limit value to a predefined maximum value. The requested motor torque follows again the limits until the limit value no longer effects the requested motor torque.

A zero request of the road wheel actuator motor torque can further be achieved by modifying the requested motor torque.

If a passive mode is detected, the signal from the passive mode detector causes a modification of the requested position of the rack by a modification controller. The modification controller outputs position increments as a function of the actual road wheel actuator motor torque. The integrated position increments along with the original position request results in a modified position request, which requires no output from the position controller to be kept, therefore no torque is requested from the motor. The position controller then receives the modified requested position, the actual position of the rack and further information and generates based on the information a torque request, which gradually decreases over time to zero.

If the signal from the passive mode detector indicates that the vehicle is activated and the conditions for the passive mode are not met anymore, the requested position is no longer modified and the torque request is based on the actual requested position.

Both preferred embodiments have in common, that the torque request is set to zero, which leads to a reduction of power consumption of the steering system hindering the system to warm up.

Preferred embodiments of the present invention also are applicable to rear wheel steering systems with the road wheel actuator being situated at the rear axle of the motor vehicle. Such a road wheel actuator is also implemented to move a steering rack to a desired position and thus to steer the rear wheels.

Preferred embodiments of the present invention also are applicable to electric power assisted steering (EPAS) systems with external driving interfaces for the motor vehicles. Such a steering actuator is also implemented to move a steering rack to a desired position and thus to steer the road wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for power saving in a steering system of a motor vehicle including a road wheel actuator acting on a rack to turn steerable road wheels and a controller configured or programmed to generate an operation signal for the road wheel actuator, the controller including a position controller configured or programmed to generate a motor torque request based on an actual and/or a measured position of the rack and a requested rack position, the method comprising:

detecting a passive mode of the steering system with a passive mode detector of the controller in response to the motor vehicle being stopped and no steering input being provided; and in response to the passive mode being detected by the passive mode detector, setting the motor torque request to substantially zero in order to save power.

2. The method according to claim 1, wherein the motor torque request is set to substantially zero by usage of a torque limiter, which limits the motor torque request gradually to substantially zero in response to a passive mode being detected.

3. The method according to claim 2, wherein the torque limiter gradually increases a limit value to a predefined maximum value in response to a signal from the passive mode detector indicating that the motor vehicle is activated and that the passive mode is no longer present.

4. The method according to claim 1, wherein the motor torque request is set to substantially zero by modifying the requested rack position.

5. The method according to claim 4, wherein the requested rack position is gradually modified by ramping a previous modification of the requested rack position to substantially zero if a signal from the passive mode detector indicates that the motor vehicle is activated and that the passive mode is no longer present.

6. A steer-by-wire-steering system of a motor vehicle configured or programmed to carry out the method according to claim 1.

7. The steer-by-wire-steering system according to claim 6, wherein the rack is part of a front axle or a rear axle.

8. The method according to claim 1, further comprising permitting the steerable road wheels to be turned in response to a signal from the passive mode detector indicating that the motor vehicle is activated and that the passive mode is no longer present.

* * * * *